J. J. RICHARDS, Jr.
HANDLE AND CLOSURE FOR BOTTLES.
APPLICATION FILED MAY 10, 1915.
1,174,091.
Patented Mar. 7, 1916.
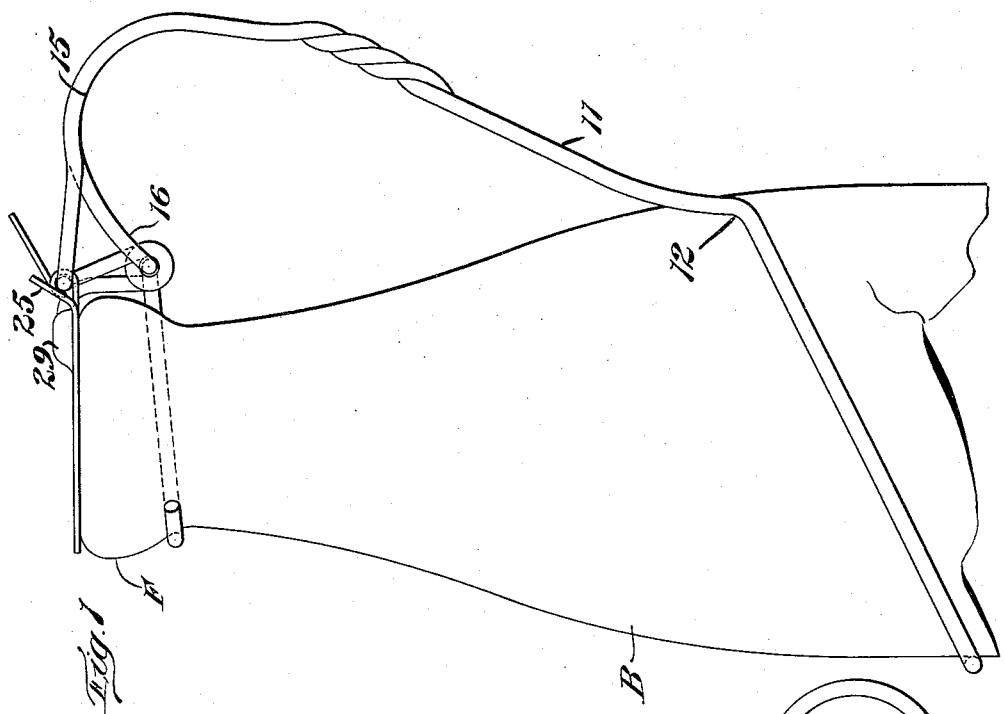
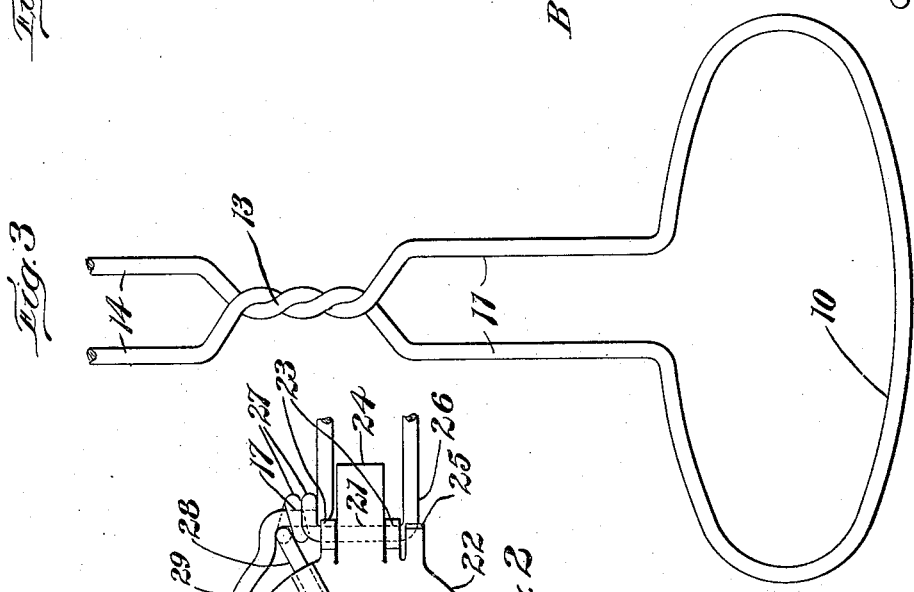

UNITED STATES PATENT OFFICE.

JOHN J. RICHARDS, JR., OF BROOKLINE, MASSACHUSETTS.

HANDLE AND CLOSURE FOR BOTTLES.

1,174,091.  Specification of Letters Patent.  Patented Mar. 7, 1916.

Application filed May 10, 1915.  Serial No. 27,185.

*To all whom it may concern:*

Be it known that I, JOHN J. RICHARDS, Jr., a citizen of the United States, and resident of Brookline, county of Norfolk, Commonwealth of Massachusetts, have invented an Improvement in Handles and Closures for Bottles, of which the following description, in connection with the accompanying drawings, is a specification, like characters on the drawings representing like parts in each of the several views.

This invention relates to an improved handle for milk bottles and other like containers, that in its preferred and more complete embodiment has combined therewith a cover closure that, as the handle is fitted to place on the bottle, is positioned so as to swing normally down to lie flush with the top of the bottle with a capability of being readily lifted by a rearwardly projecting thumb piece.

One prime object of the invention is to provide a device of this character of simple and cheap construction, preferably formed from one piece of wire, that may be quickly and easily applied to, and as readily detached from a bottle, and being capable of holding the bottle securely with no possibility of casual displacement.

According to a further important feature of the invention the upper part of the handle to which the cover is pivoted, is adapted to engage the neck of a bottle in a manner so as to accurately position the cover relative to the bottle top, being formed also in a manner so as to maintain a secure and reliable hold on the bottle neck.

The foregoing and other objects and features of the invention will be better understood from the following detailed description taken in connection with the accompanying drawings and will be thereafter pointed out in the appended claims.

Referring to the drawings: Figure 1 shows in side elevation a handle and cover formed in accordance with my invention applied to an ordinary milk bottle; Fig. 2 is a plan view showing the cover and the neck engaging portion of the handle, the rest of the handle being broken away; and Fig. 3 is a front elevation showing the lower portion of the handle.

A suitable length of stout wire, of stock having suitable resilient properties, has its central portion formed into a loop of generally circular form as seen at 10, this loop being of a size a little larger than the body of any bottles intended to be held by the device so that it may be easily slipped thereover. From this loop the wire extends in two spaced apart generally parallel portions 11 which extend upward and out from the loop 10 at an obtuse angle as seen at 12 so that when the loop 10 is canted into gripping engagement with the bottle body as seen in Fig. 1, the portions 11 will extend out from the bottle at an acute angle to form a hand hold. At an intermediate point these outwardly extending portions 11 are brought together in a twist 13 which gives proper stiffness to the handle and preserves the relative alinement of the two side portions, while permitting the spaced apart portions 11 to contribute to the yielding property of the loop 10 as it is canted up to grip a bottle body. From the twist 13 the wire portions are again spread apart as seen at 14 and brought upward with an inward rounding as seen at 15 to make a convenient hand grip. Thence one inwardly and downwardly curved wire portion as seen at 16 is bent laterally at right angles for a short distance as seen at 17 and thence extended out in a wide bend to form a hook 18 adapted to engage around the bottle neck just under the top flange thereof. It will be noted that the extremity 19 of this neck engaging hook extends around some little distance beyond the lateral center of the device as applied to a bottle as indicated at the point 20, the purpose of this being to permit this hook to be swung in laterally and snap around the bottle neck after the loop 10 has been slipped down over the bottle body to approximately the proper position. The other wire prong is extended in to a point adjacent one corner of the bottle top when the device is in place, and is there bent in toward the first named prong at right angles as seen at 21 to furnish a pivot bearing for the cover 22. This cover is preferably formed as a flat disk stamping having rearwardly projecting ears 23 to engage the pivot 21 with an intermediate rearwardly projecting thumb piece 24 and preferably another rearwardly projecting prong 25 at one side turned up and arranged so as to engage the wire at 26 to limit the extent to which the cover may be swung upward so that it may not reach vertical position and will always tend to close by gravity. Thence the last described wire prong is looped around the portion 17 as seen at 27 and its extremity is upturned and brought inward as seen at 28 to engage over the bottle top when the device is in position; the cover 22 having a small dished out portion 29 to afford clearance for this wire prong extension.

In use it will be understood that the loop portion 10 will be slipped over the bottle body while held approximately transverse thereof until the hook portion 18 is in position to snap under the flange top F of the bottle B. In this operation the upper part of the handle is preferably sprung laterally so that the hook 18 is at one side of the bottle top and in position to be sprung into engagement therewith, the extremity 19 yielding outward for this purpose. As the hook 18 is thus sprung to place, the inwardly projecting prong 28 comes into engagement with the rounded top of the bottle and positions the device accurately with respect to the bottle top so that the cover 22 will lie flush therewith as it swings downwardly by gravity. It will be understood that the hand grip portions 11, 14 of the device are biased to spring outward normally from the operative position of the device shown, so that as they are sprung inward to cause the hook 18 to engage the bottle neck the loop 10 will be canted obliquely and thus get a strong friction grip on the bottle body as will be readily understood. The extent of this resilient yielding capability of the wire stock particularly in the hand grip portions 11, 13, 14 may be such that bottles of a considerable range of sizes and forms may be engaged and securely held by the device, the loop portion 10 being canted to a more or less oblique position according to whether the bottle body is considerably smaller than said loop or nearly the size thereof.

It will be noted that the inwardly projecting prong 28 constitutes means whereby the device is substantially self-positioning so as to permit the cover to lie flat on the bottle top, and once this prong is engaged with the top of the bottle, the hook portion 18 will find a seat around the curving neck of the bottle underneath with a tendency to hold the prong 28 down against the bottle top.

It is to be understood that the present embodiment is merely illustrative as to details of construction and in no wise restrictive. These details may obviously be varied in many ways; for example, while only one intermediate twist 13 is shown in the hand grip portion of the device, either one such twist or more than one may be employed without in any wise affecting the essentials of the invention. Likewise other details, such as the way in which the end portions of the wire are bent and interengaged to engage the bottle neck and pivotally hold the closure cover in correct position relative thereto, may be fashioned in various ways that may be devised with the present showing as a basis. I therefore desire the present embodiment to be considered in all respects as illustrative and not restrictive, referring to the appended claims rather than to the foregoing description to indicate the scope of the invention.

Having described my invention, what I claim as new and desire to secure by Letters Patent is:

1. A bottle holder, comprising a wire or rod with an intermediate portion formed as a hand hold to extend upward in spaced apart relation to the bottle, a lower portion formed as a loop adapted to loosely fit the body of the bottle, and an upper portion bent to engage around a substantial portion of the neck of the bottle, said upper and lower portions normally extending in substantially divergent relation and the portions of said holder having a spring bias whereby as said loop and neck engaging portions are engaged with the bottle they mutually react to hold each other clamped thereto.

2. A bottle holder, comprising a wire or rod with a loop at one end portion adapted to loosely fit the body of the bottle, with a portion thence projecting outward from the bottle, thence upward to form a hand hold, and thence inward with a hook at its extremity to engage the neck of the bottle laterally, the parts being so formed and bent that said hand hold portion must be sprung to permit engaging of said hook around the bottle neck, and having a spring bias whereby as said loop and said hook are operatively engaged with the body and neck of the bottle respectively, they mutually react to hold each other clamped thereto.

3. A bottle holder, comprising a wire or rod formed with a loop adapted to loosely fit the body of a bottle with a portion projecting out from said loop, thence upward and inward toward the bottle to constitute a hand hold spaced from the bottle, and thence projected in with a hook at its end to engage the neck of the bottle, the parts being so formed and proportioned that an intermediate portion of the material is bent and sprung with a canting of said loop against the body of the bottle to obtain a friction grip thereon, as said hook is engaged with the bottle neck, and said parts having a spring bias whereby as said loop and hook are operatively engaged with the bottle body and neck respectively, each reacts through the intermediate portion of the holder to hold the other clamped to the bottle.

4. A bottle holder, comprising a wire or rod with a loop at one end portion adapted to loosely fit the body of the bottle, with a portion projecting out from said loop, thence upward to form a hand hold, and thence inward with a neck embracing formation at its extremity to engage the neck of the bottle, the intermediate portions of said holder being formed to hold said loop and said neck embracing formation normally extending at a substantial angle to each other, and being so proportioned that said loop must be canted obliquely with respect to the bottle sides and the intermediate portion of the holder sprung, to bring said neck embracing formation into engagement with the neck of the bottle, the portions of said holder having a spring bias whereby as the loop and neck embracing formation are engaged with the bottle they mutually react to hold each other clamped thereto.

5. A bottle handle and closure, comprising a wire or rod formed with an intermediate portion constituting a hand hold and adapted to extend up alongside of the bottle spaced apart therefrom, a lower portion formed as a loop adapted to fit loosely the body of a bottle, a top portion having a neck engaging formation adapted to engage the bottle just below the top flange thereof having also an upward and inward extension adapted to take over the top flange of the bottle whereby said top portion is alined by said flange, said intermediate and upper and lower portions of said wire or rod having a spring bias and mutually reacting to hold said upper and lower portions engaged with the bottle, and a closure pivotally mounted at the top portion of said handle in position to lie flat on the top of a bottle engaged by said handle and as alined by the top flange thereof.

6. A bottle handle and closure, comprising a wire or rod formed with a loop adapted to fit loosely the body of a bottle, with a portion projecting out from said loop thence upward and inward toward the bottle to constitute a hand hold spaced from the bottle and thence bent to extend in with a hook at its end to engage the neck of the bottle, there being an extended portion engageable with the bottle top and coöperative with said hook to position the top portion of the handle accurately with reference to the bottle top, and a closure swingingly mounted on the top portion of the handle so formed and adapted to lie flush with the top of the bottle as held and relatively positioned by said handle.

7. A bottle handle and cover, comprising a wire or rod formed with a loop at an intermediate portion adapted to fit loosely the body of a bottle, with end portions thence projecting upward to form a hand hold, one extremity of said wire being thence extended inward with a hook at its extremity to engage underneath the top flange of the bottle, the other extremity being extended up to engage over the bottle top and coöperate with said hook to position said handle accurately on the bottle, and a cover pivoted at the top of said handle adapted to lie flat on the bottle top with the handle engaging the bottle.

8. A bottle handle and cover, comprising a wire or rod formed with a loop at an intermediate portion adapted to fit loosely the body of a bottle, with end portions thence projecting upward to form a hand hold, one extremity of said wire being thence extended inward with a hook at its extremity to engage underneath the top flange of the bottle, the other extremity of said wire being extended up to engage over the bottle top and coöperate with said hook to position said handle accurately on the bottle, and a cover pivoted at the top of said handle adapted to lie flat on the bottle top with the handle engaging the bottle, said cover being formed with a thumb piece and also with a projection adapted to engage a relatively fixed part to prevent the cover from swinging to a vertical position for the purpose stated.

In testimony whereof, I have signed my name to this specification, in the presence of two subscribing witnesses.

JOHN J. RICHARDS, Jr.

Witnesses:
LOUISE A. JORDAN,
HARVEY R. NUTTING.

Copies of this patent may be obtained for five cents each, by addressing the "Commissioner of Patents, Washington, D. C."